(12) United States Patent
Stocker

(10) Patent No.: US 10,041,671 B2
(45) Date of Patent: Aug. 7, 2018

(54) MULTI-FLAME BURNER AND METHOD FOR HEATING A WORKPIECE

(71) Applicant: Johann Stocker, Gilching (DE)

(72) Inventor: Johann Stocker, Gilching (DE)

(73) Assignee: Linde Aktiengesellschaft, Munich (DE)

( * ) Notice: Subject to any disclaimer, the term of this patent is extended or adjusted under 35 U.S.C. 154(b) by 13 days.

(21) Appl. No.: 15/405,863

(22) Filed: Jan. 13, 2017

(65) Prior Publication Data

US 2017/0146237 A1    May 25, 2017

Related U.S. Application Data

(63) Continuation-in-part of application No. 14/059,738, filed on Oct. 22, 2013.

(30) Foreign Application Priority Data

Oct. 23, 2012   (DE) .................. 10 2012 020 801

(51) Int. Cl.
*F23D 23/00*    (2006.01)
*F23D 99/00*    (2010.01)

(52) U.S. Cl.
CPC ............. *F23D 23/00* (2013.01); *F23D 91/02* (2015.07); *F23D 2203/00* (2013.01)

(58) Field of Classification Search
CPC ..... C21D 9/12; C21D 9/10; F23C 5/02; F23C 5/06; F23C 5/28; F23C 5/32; F23D 23/00; F23D 14/56; F23D 14/38; F23D 11/005; F23D 91/02; F23D 2203/00
See application file for complete search history.

(56) References Cited

U.S. PATENT DOCUMENTS

| | | | |
|---|---|---|---|
| 1,952,356 A | 3/1934 | Briggs | |
| 1,960,609 A * | 5/1934 | Werner | F23D 14/00 239/417.5 |
| 2,407,230 A * | 9/1946 | Furkert | C21D 1/08 266/132 |
| 2,749,109 A * | 6/1956 | Maud | C03B 29/06 34/371 |
| 3,775,038 A * | 11/1973 | Pillard | F23D 23/00 431/175 |
| 4,021,287 A * | 5/1977 | Martin | B29C 65/106 156/497 |

(Continued)

FOREIGN PATENT DOCUMENTS

| | | |
|---|---|---|
| CA | 2204928 | 11/1997 |
| DE | 23 60 607 A1 | 6/1974 |

(Continued)

OTHER PUBLICATIONS

European Search Report of EP application No. 13001419.4 dated Oct. 15, 2013, 6 pages, European Patent Office.

*Primary Examiner* — Steven B McAllister
*Assistant Examiner* — Steven Anderson, II
(74) *Attorney, Agent, or Firm* — Philip H. Von Neida

(57) ABSTRACT

A multi-flame burner is disclosed with burner heads, which are set up to generate at least one burner flame directed along a respective flame axis when supplied with a fuel, wherein the flame axes of respectively adjacent burner heads are inclined relative to each other. A method for preheating a workpiece, in particular a pipe or large-diameter pipe, using a multi-flame burner is also disclosed.

14 Claims, 3 Drawing Sheets

(56) References Cited

U.S. PATENT DOCUMENTS

| | | | |
|---|---|---|---|
| 4,029,526 A * | 6/1977 | Carrigan | C21D 9/32 |
| | | | 148/586 |
| 5,979,741 A | 11/1999 | Iguchi | |
| 2010/0206965 A1* | 8/2010 | Gibowski | B05B 15/061 |
| | | | 239/587.5 |
| 2011/0002122 A1* | 1/2011 | Tsao | F21S 8/033 |
| | | | 362/277 |
| 2014/0065564 A1* | 3/2014 | Staley | F23D 14/28 |
| | | | 432/88 |

FOREIGN PATENT DOCUMENTS

| | | | |
|---|---|---|---|
| DE | 2360607 A1 * | 6/1974 | F23D 14/48 |
| DE | 44 29 069 A1 | 2/1996 | |
| DE | 196 19 171 C1 | 5/1997 | |
| FR | 2326660 A1 * | 4/1977 | B23K 9/235 |
| GB | 1427342 | 3/1976 | |

\* cited by examiner

MULTI-FLAME BURNER AND METHOD FOR HEATING A WORKPIECE

CROSS REFERENCE TO RELATED APPLICATIONS

The present application claims priority from U.S. patent application Ser. No. 14/059,738, filed on Oct. 22, 2013 and German Patent Application DE102012020801.4 filed on Oct. 23, 2012.

BACKGROUND OF THE INVENTION

The invention relates to a multi-flame burner with burner heads and accompanying connection pipes, which are set up to generate at least one burner flame directed along a respective flame axis when supplied with a fuel, as well as to a method for preheating a workpiece, in particular a pipe or large-diameter pipe, with a corresponding multi-flame burner.

Workpieces must be preheated in a very wide range of material handling and manufacturing processes. The present invention here draws reference first and foremost to preheating in welding operations. However, the invention can basically also be used in other methods in which introducing heat by means of flames is desired.

In known welding processes, the workpieces to be welded are preheated for various reasons. The primary danger associated with a lack of preheating lies in the so-called hydrogen embrittlement in the heat affected zone. In addition, transformable steels there tend to exhibit an increased hardness at elevated cooling rates of the kind encountered without preheating. This yields an increased tendency toward cold crack formation in the joining region of the workpiece. For example, these disadvantages become even greater while welding pipes with an increasing pipe diameter. For this reason, preparing large-diameter pipes via preheating for a subsequent welding operation represents a preferred application for the present invention.

The achievable hardness, and hence the danger of cold cracks, here essentially depends on the thickness of the workpiece to be machined, two- or three-dimensional heat dissipation, present alloy elements and their contents, the respective heat introduced in the welding operation and/or the component temperature. The latter can be influenced by preheating. Preheating reduces the cooling rate of the seam region, and improves hydrogen effusion. In addition, it has a favorable effect on the residual welding stress state of the welded joint.

The necessary preheating temperature can be respectively ascertained, and the heat to be introduced and/or the use of respective preheating device can be determined based hereupon. In particular the basic tenacity of the material, its wall thickness, the seam shape, the used welding technique and welding speed are to be considered when determining the preheating temperature.

Preheating is basically required at processing temperatures of under 5° C. and when specific thickness limits are exceeded (especially for high-strength steels). For example, the preheating temperature measures 80 to 200° C.

As a rule, workpieces are preheated prior to welding preferably using multi-flame burners, which for reasons explained in greater detail below are operated with acetylene and oxygen-containing fuel mixtures or acetylene and compressed air-containing fuel mixtures, for example. Preheating takes place to prepare a region proximate to the welded seam on the workpiece (e.g., pipe or large-diameter pipe) for introducing a welded seam in this preheated region, which is hence already warm at the start of the welding process (warm here means at least warmer than the ambient air).

In particular when preheating large-diameter pipes, concentrated heat must be introduced into the region close to the welded seam, without melting the workpiece surface and leaving behind residual moisture from the exhaust gas of the flame. However, the large amount of hot exhaust gases that arises given a concentrated introduction of heat places a burden on the burner itself, depending on burner configuration. This can end up thermally damaging the used burner heads. This applies in particular given improper operation and adjustment. Appropriate safety precautions are expensive.

In this conjunction, pipes with a diameter ranging from 1 to 12 meters are designated as large-diameter pipes.

Therefore, the need exists for improved ways of heating workpieces, in particular pipes and large-diameter pipes, which do not exhibit these disadvantages and can be safely operated.

SUMMARY OF THE INVENTION

Against this backdrop, the invention proposes a multi-flame burner with a plurality of burner heads and accompanying connection pipes, which are set up to generate at least one burner flame directed along a respective flame axis when supplied with a fuel, As a consequence, the set object is achieved by offsetting at least half of the connection pipe, so that the flame axes of respectively adjacent burner heads are inclined divergent relative to each other.

In a further embodiment of the invention, there is disclosed a method for preheating a workpiece by a multi-flame burner which comprises a plurality of burner heads and accompanying connection pipes, which are set up to generate at least one burner flame directed along a respective flame axis when supplied with a fuel, characterized in that at least half of the connection pipe is offset in design, so that the flame axes of respectively adjacent burner heads are inclined divergent relative to each other, and the at least one burner flames generated by the multi-flame burner is directed at the workpiece.

While the invention is described primarily with regard to preheating pipes or large-diameter pipes, it is not limited thereto, since it was found that the present invention can be used to special advantage for preheating individual components or component groups even in large container construction in general.

The multi-flame burner is preferably configured in such a way that all connection pipes are offset in design.

It is especially preferred that the multi-flame burner be configured in such a way that the offset connection pipes exhibit an offset angle of 30° to 60°, preferably of approximately 45°.

It is particularly advantageous for the multi-flame burner to be characterized by the fact that the connection pipes be pivoted with a respective connection nozzle by way of a screw joint, wherein the respective other end of the connection nozzles is secured to a shared feed line, and can be supplied with the fuel through the shared feed line.

In an advantageous further development of the invention, the burner heads are provided in at least two groups (A and B) of burner heads, wherein the burner heads of at least one first group (A) are each arranged alternately to the burner heads of at least one other group (B), and the flame axes of the burner heads of at least the first group are inclined relative to the flame axes of the burner heads of at least the one other group.

The burner heads within each group are best arranged in the same direction or parallel to each other.

It can also be advantageous to provide the burner heads in at least two groups, wherein the burner heads of the at least two groups each are alternately arranged, and the flame axes of the burner heads in at least one or each group each deviate in relation to the flame axes of at least one or each other group. For example, the flame axes within each group can be arranged in parallel. This makes serial production especially easy.

In an advantageous further development of the invention, the burner heads each exhibit flame axes, which are axially and/or radially inclined in relation to a perpendicular on a center line of the feed line, preferably respectively adjacent burner heads inclined by an angle of 5° to 45° relative to each other.

A corresponding multi-flame burner is preferably configured in such a way that the flame axes of the adjacent burner heads are each skewed in relation to each other. For example, they can be inclined axially or radially to the perpendicular on the center line by an angle of 5 to 45°. Among other factors, the respectively selected angles also depend on the requirements of the respective heating process. A tighter angle is required in particular given the necessity of extensive local heating. Larger angles are possible if the goal is to discharge the generated exhaust gases in an especially effective manner.

The multi-flame burner best exhibits a gas supply device set up to supply the multi-flame burner with at least one gaseous fuel, wherein the gas supply device is preferably set up to supply the multi-flame burner with an acetylene-containing fuel mixture, especially preferably an acetylene-(compressed) air-mixture or an acetylene-oxygen mixture, as the at least one gaseous fuel.

Advantageously provided is at least one gas supply device set up to supply the multi-flame burner with at least one gaseous fuel. The latter is preferably controllable in design, so that the respectively introduced thermal output can be controlled and/or the provision of respectively adjusted gas mixtures ensures an especially advantageous adaptation to the material to be welded.

In a further advantageous embodiment, a multi-flame burner according to the invention exhibits at least 4, 6 or 8 burner heads. The burner heads are preferably spaced apart 5 to 15 cm from each other. Corresponding distances depend on the homogeneity of the heating to be achieved and/or the permissible temperature of the burner heads.

In another preferred embodiment, the burner heads exhibit burner nozzles, wherein the burner nozzles of the respectively adjacent burner heads are offset by 1 to 10 cm relative to a shared center line between the burner nozzles. As also explained in greater detail below in conjunction with the figures, the origins of the respective flames are here spaced a defined distance apart from each other, thereby further reducing the influence of the burner heads on each other.

It was found that an especially advantageous length for the totality of the burner head and connection pipe ranges from 8 to 25 cm for numerous applications.

An advantageous further development of the present invention provides that the multi-flame burner exhibit a feed line configured as a bent shaft, wherein the bent shaft is preferably made essentially out of stainless steel.

The feed line, which can also be referred to as a shaft or expressed differently once again as a pipeline, is best made out a metallic material for supplying the fuel. A bent configuration makes it adjustable to the shape of the workpiece to be preheated, e.g., to the curvature of a large-diameter pipe to be preheated, which is very advantageous in terms of the present invention. From a production standpoint, stainless steel is especially suitable as the metallic material for such a bent configuration.

As mentioned, the burner heads with the flame axes inclined in relation to each other are advantageously each alternately secured to a shared feed line and can be supplied by way of the latter in a corresponding multi-flame burner. The feed line here simultaneously functions as a fuel distributor and fastening device for the burner heads. For example, a corresponding feed line can be bent, and thereby adjusted to the shape of a workpiece to be heated. During the manufacture of a multi-flame burner according to the invention, the feed line is advantageously deformed in such a way as to essentially reproduce the corresponding shape of the workpiece. In other words, for example, it is best that a circular segment have the same midpoint as a (large-diameter) pipe to be preheated and a bend adjusted based on the larger radius (pipe radius plus radial distance between the pipe and feed line). In addition, other shapes may also be advantageous and in keeping with the invention.

The adjustability of the multi-flame burner to the shape of the workpiece to be preheated, in particular to the diameter of the pipe to be preheated, is an essential advantage to the present invention in relation to prior art.

In terms of the method, the set object is achieved by a method for preheating a workpiece, in particular a pipe or large-diameter pipe, in which a multi-flame burner is used, and burner flames generated by the multi-flame burner are directed at the workpiece. The method according to the invention benefits from the advantages specified above and below, to which express reference can thus be made.

The burner heads are alternately interleaved relative to each other according to the invention, so that the respectively created flames point away from each other. As a result, the hot exhaust gases generated by the flames cannot damage each other.

Corresponding burner heads are usually attached to a shared feed line in the form of a pipeline. The latter can be straight or bent as desired, and exhibits a central axis that is also straight or bent, depending on the configuration of the feed line. The alignment of flame axes is here advantageously such that the latter are inclined axially (i.e., longitudinally relative to the feed line) and/or radially (i.e., transversely relative to the latter) in relation to a respective perpendicular on the central axis at the attachment site. The inclination of adjacent burner heads is here preferably opposite in at least one of these directions. This can mean that the burner heads are radially alternately inclined clockwise and counterclockwise in relation to the axis of the feed line.

As a consequence, one essential aspect of the present invention involves an arrangement or alignment of the burner heads, and hence the flame and exhaust gas direction, that deviates from prior art. The exhaust gas is guided by inclining the burners in such a way that their primary flames hit a region near the welded seam in line with their function, but the exhaust stream does not heat the adjacent burner(s). As explained below, preferably defined angular positions of the burners relative to each other are possible and must be maintained for this purpose. The latter advantageously arise from offsetting the connection pipes, and potentially from how the connection pipes are aligned at the rotatable screw joint.

As a consequence, the invention makes it possible to introduce a maximum thermal output onto a small space, in particular onto a large-diameter pipe that itself rotates. Despite a more concentrated introduction of heat by comparison to devices in prior art, the danger of burners heating is minimized, even given an incorrect operation. This will result in lower downtimes and less need for repairs, which makes corresponding methods economically advantageous. The measures proposed by the invention yield a significantly reduced burner weight in relation to the thermal output to be introduced.

The overall achievable lower burner costs and more effective utilization of a corresponding burner lead to economic advantages in comparison to known devices, in particular in the construction of large containers.

As already mentioned, a corresponding multi-flame burner can advantageously be supplied with an acetylene mixture, in particular an acetylene/oxygen mixture, making it possible to also use the advantages for known acetylene processes with the burner according to the invention. As known, the especially hot, concentrated acetylene/oxygen flame yields a rapid temperature rise on the workpiece surface, and causes heat to accumulate inside the workpiece at high temperature gradients, so that a large amount of heat can be locally introduced. However, acetylene/compressed air flames and/or acetylene/suction air burners can also be used, for example. Acetylene/compressed air flames are soft and gentle, yet intensive and efficient. They can be very well controlled over the entire area of potential acetylene/air mixture formation, and are largely immune from re-ignition. This yields advantages relating to industrial safety. However, the achievable lower surface temperature results in a thorough heating of the workpiece. Even lower temperature gradients can be achieved with the mentioned suction air burners, which operate according to the Bunsen principle.

The described multi-flame burners as a whole advantageously exhibit 4, 6 or 8 burner heads. As a consequence, this yields advantages by comparison to previously known three-headed preheating burners, since a larger area of a workpiece can be heated at any one time. For example, the arrangement according to the invention makes it possible to attach eight or more burner heads to a distribution pipe, specifically the already mentioned feed line, without the latter overheating themselves or each other impermissibly. As mentioned, a larger thermal output can as a result be introduced over a small space, in particular over a rotating large-diameter pipe. The number of usable burner heads is not confined to four or eight; rather, burners with 10, 12, 14, 16, 18 or 20 burners or a higher number of burners can also be manufactured.

It is especially advantageous if the respective burner heads arranged adjacent to each other each exhibit diverging flame axes, and thus generate diverging burner flames. As mentioned, this causes the exhaust gas streams of corresponding burner flames to point away from each other, and no reciprocal overheating takes place.

BRIEF DESCRIPTION OF THE DRAWINGS

The invention will be explained in greater detail with reference to the attached drawings, which show a preferred embodiment of the invention.

Elements corresponding to one another on the figures bear identical reference numbers. Repeated explanations will be avoided for the sake of clarity.

DETAILED DESCRIPTION OF THE INVENTION

Figure 1:
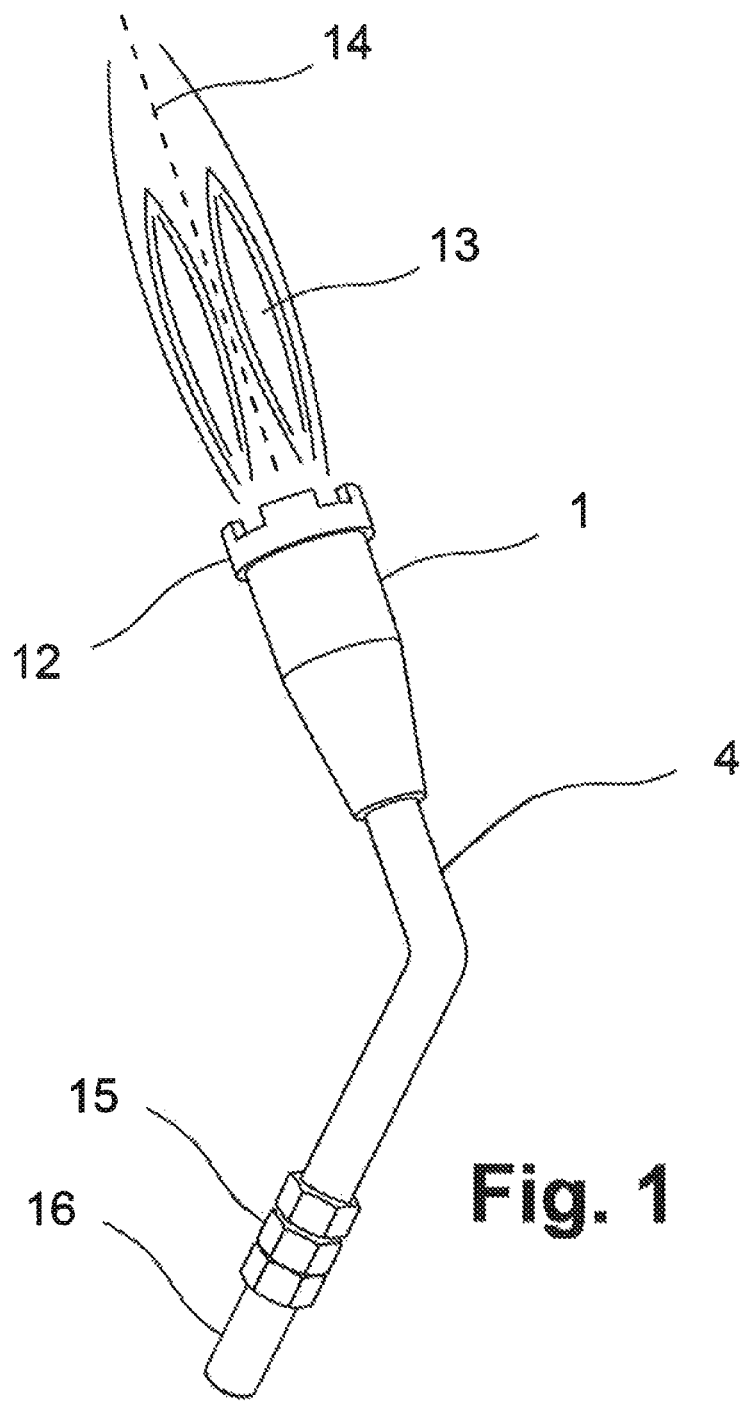
FIG. 1 shows a burner head, which can be used for a multi-flame burner according to an embodiment of the invention.

FIG. 1 shows a schematic view of a burner head 1 exhibiting a nozzle ring 12 that can have any desired number of preferably concentrically arranged nozzles, through which fuel can escape. Igniting the fuel produces a burner flame 13, which runs along a flame axis 14. The burner head 1 can be attached to a feed line by way of an offset connection pipe 4 along with a screw joint 15 and connection nozzle 16. For example, the connection nozzle 16 is welded to the feed line.

Figure 2:
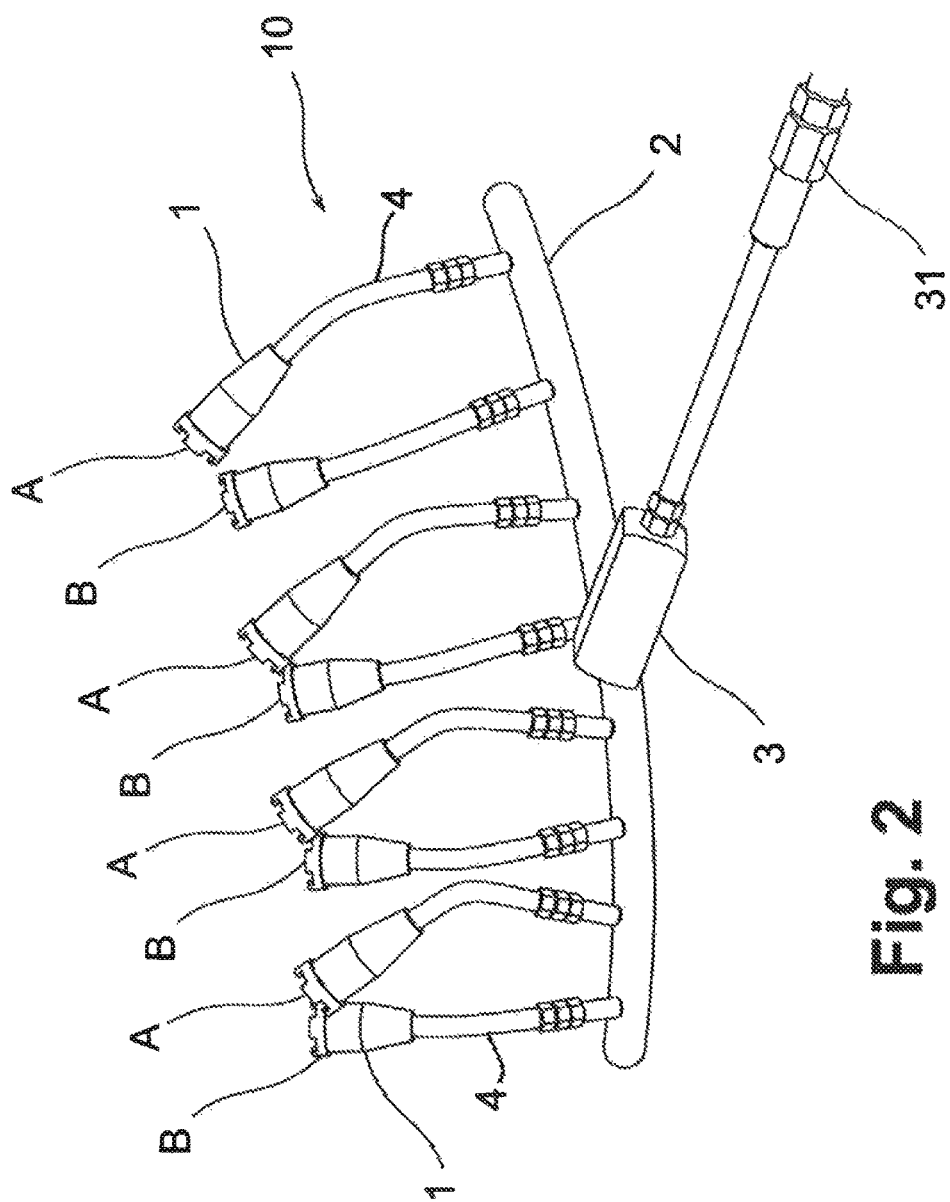
FIG. 2 shows a schematic, side view of a mufti-flame burner according to an embodiment of the invention.

FIG. 2 shows a schematic, side view of a multi-flame burner according to an especially preferred embodiment of the invention, which is marked 10 overall. The multi-flame burner 10 encompasses a total of eight burner heads 1, each with respectively accompanying, offset connection pipes 4, not all of which are provided with reference numbers. The burner heads 1 are here combined into groups of burner heads A and B. A first group of burner heads A is here arranged in such a way that the respective nozzle units or the nozzles provided there can yield burner flames with flame axes essentially arranged in the same direction. The same holds true for the burner heads in group B. However, the flame axes 14 in group A and the flame axes 14 in group B are inclined or skewed relative to each other given the inclined position of the burner heads 1, so that respectively produced exhaust gases and/or the generated waste heat can damage non-adjacent burner heads 1.

The screw joints 15 described above and the connection nozzles 16 are used to secure the burner heads 1 to a feed line 2, for example one that is bent, and hence can be adjusted to the shape of a workpiece to be machined. The feed line can be coupled with a supply line 3, which can exhibit other devices, such as a manometer and regulator. In particular, such a supply line can exhibit a mixing unit 31, with which an acetylene/oxygen mixture and/or an acetylene/air mixture can be generated.

In another, simplified configuration of the invention, it can also be advantageous for specific, less demanding applications to do without the screw joint 15, and hence the ability of the offset connection pipe to rotate. In this case, the connection nozzle 16 can be lengthened and offset in design, thereby combining the connection nozzle 16 and connection pipe 4 into a single component.

Figure 3:
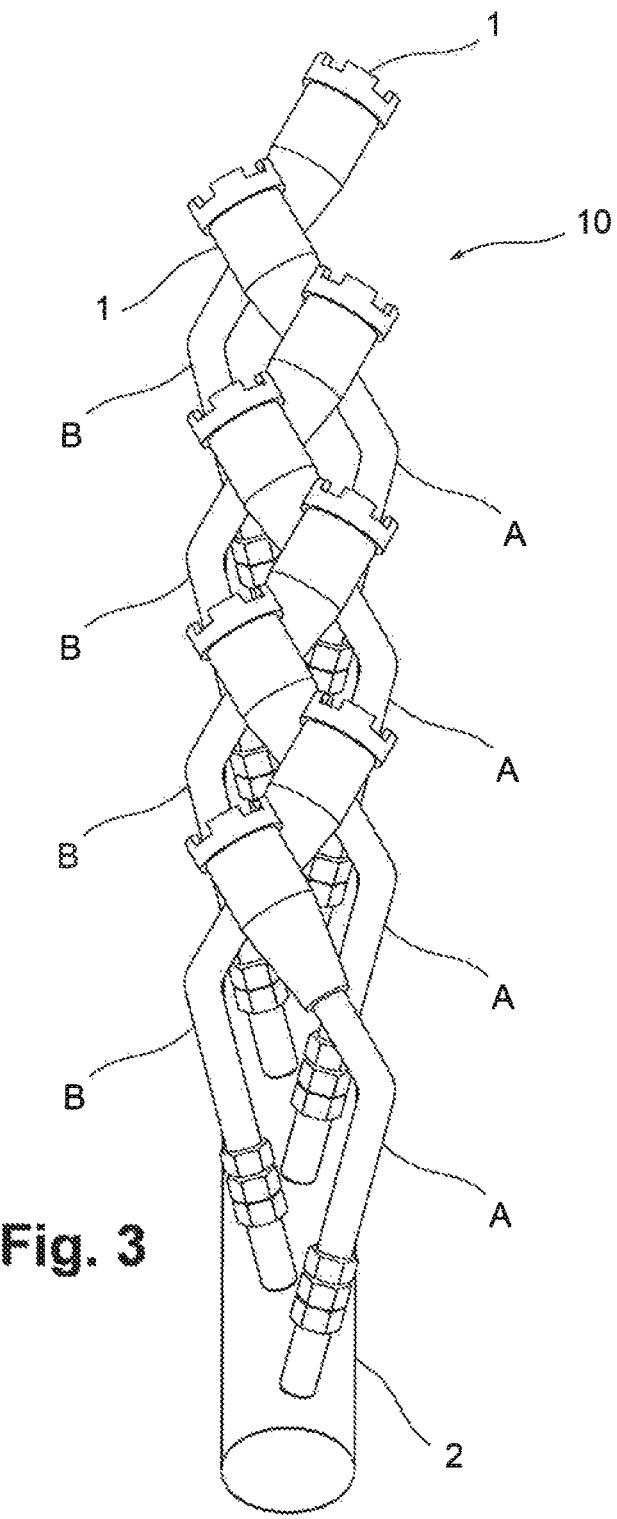
FIG. 3 shows a schematic, longitudinal view of a multi-flame burner according to an embodiment of the invention.

FIG. 3 shows a longitudinal view of a multi-flame burner according to an especially preferred embodiment of the invention, which is also marked 10. As evident, the respective burner heads 1 are slanted relative to each other, so that the arising flames 13 point away from each other. The feed line 2 can be bent or straight in design.

REFERENCE LIST

1 Burner head
A, B Group

10 Multi-flame burner
12 Nozzle ring
13 Burner flame
14 Flame axis
15 Screw joint
16 Connection nozzle
2 Connection line, shaft
3 Supply line
4 Offset connection pipe
31 Mixing unit

What I claim is:

1. A multi-flame burner with a plurality of burner heads and accompanying connection pipes, which are set up to generate at least one burner flame directed along a respective flame axis when supplied with a fuel, characterized in that the burner heads are provided in at least two groups (A, B) of burner heads, wherein the burner heads of at least one other group (B), and at least half of a connection pipe is offset, and the flame axes of the burner heads of at least the first group (A) are inclined divergent relative to the flame axes of the burner heads of at least the one other group (B), wherein the burner heads within each group (A, B) are each arranged in the same direction or in a direction parallel to each other, and the burner heads are alternatively interleaved relative to each other and the burner flames of group (A) point away from the burner flames of group (B).

2. The multi-flame burner according to claim 1, characterized in that all connection pipes are offset.

3. The multi-flame burner according to claim 1, characterized in that the offset connection pipes exhibit an offset angle of 30° to 60°.

4. The multi-flame burner according to claim 3, characterized in that the offset connection pipes exhibit an offset angle of approximately 45°.

5. The multi-flame burner according to claim 1, characterized in that a respective connection pipe is connected to a respective connection nozzle by way of a screw joint, wherein the respective other end of the connection nozzle is secured to a shared feed line, and can be supplied with the fuel through the shared feed line.

6. The multi-flame burner according to claim 1, in which the burner heads each exhibit flame axes, which are axially and/or radially inclined in relation to a perpendicular on a center line of the shared feed line.

7. The multi-flame burner according to claim 6, wherein respectively adjacent ones of the plurality of burner heads are inclined to each other by an angle of from 5° to 45° relative to each other.

8. The multi-flame burner according to claim 1, characterized in that a gas supply device supplies the multi-flame burner with at least one gaseous fuel selected from the group consisting of an acetylene-containing fuel mixture, an acetylene-(compressed) air-mixture and an acetylene-oxygen mixture.

9. The multi-flame burner according to claim 1, characterized in that a feed line configured as a bent shaft is connected to each one of the connection pipes.

10. The multi-flame burner according to claim 9, characterized in that the bent shaft is constructed from a material comprising stainless steel.

11. The multi-flame burner according to claim 1 characterized in that the burner heads are spaced apart 5 to 15 centimeters from each other.

12. The multi-flame burner according to claim 5, characterized in that the burner heads are radially alternately inclined clockwise and counterclockwise in relation to the axis of the shared feed line.

13. A method for preheating a workpiece by a multi-flame burner which comprises a plurality of burner heads and accompanying connection pipes, which are set up to generate at least one burner flame directed along a respective flame axis when supplied with a fuel characterized in that the burner heads are provided in at least two groups (A, B) of burner heads, wherein the burner heads of at least a first group (A) are each arranged alternately to the burner heads of at least one other group (B), and at least half of a connection pipe is offset, and the flame axes of the burner heads of at least the first group (A) are inclined divergent relative to the flame axes of the burner heads of at least one other group (B), and the at least one burner flames generated by the multi-flame burner is directed at the workpiece, wherein the burner heads within each group (A, B) are each arranged in the same direction or in a direction parallel to each other, and the burner heads are alternatively interleaved relative to each other and the burner flames of group (A) point away from the burner flames of group (B).

14. The method according to claim 13, characterized in that the workpiece is a pipe.

* * * * *